United States Patent
Hutsell

[15] 3,650,261
[45] Mar. 21, 1972

[54] DIESEL ENGINE

[72] Inventor: Thomas A. Hutsell, 1220 Carpenter, Mount Vernon, Wash. 98273

[22] Filed: Nov. 18, 1970

[21] Appl. No.: 90,743

[52] U.S. Cl................123/198 DB, 123/26, 123/32 J, 123/119 C, 123/119 CE, 123/140 MC
[51] Int. Cl..........................F02b 77/00, F02b 3/00
[58] Field of Search............123/26, 32 J, 198 DC, 198 DB, 123/140 MC, 119 C, 119 CE

[56] References Cited

UNITED STATES PATENTS

| | | | |
|---|---|---|---|
| 1,079,578 | 11/1913 | Peterson | 123/26 |
| 1,937,801 | 12/1933 | Tibbetts | 123/32 |
| 2,930,365 | 3/1960 | Muscato | 123/41.15 |

FOREIGN PATENTS OR APPLICATIONS

| | | | |
|---|---|---|---|
| 424,184 | 2/1935 | Great Britain | 123/26 |
| 125,569 | 7/1931 | Germany | 123/26 |
| 972,406 | 7/1959 | Germany | 123/32.8 |
| 1,002,161 | 2/1957 | Germany | 123/32.8 |

*Primary Examiner*—Mark M. Newman
*Assistant Examiner*—Ronald B. Cox
*Attorney*—Graybeal, Cole & Barnard

[57] ABSTRACT

A diesel engine having a piston chamber and a combustion chamber communicating through a port with the piston chamber; a temperature sensing means which is responsive to temperature in the combustion chamber and which controls a valve to permit fuel flow to the combustion chamber only when the temperature in the combustion chamber has reached a predetermined level to support combustion; a supercharger responsive to engine speed and arranged to deliver pressurized air to the combustion chamber when the engine is operating; and a protrusion mounted on the piston and arranged to extend into the port so as to form an annular passageway through which air blows from the piston chamber into the combustion chamber to cause better mixing of fuel and air in the combustion chamber.

11 Claims, 1 Drawing Figure

PATENTED MAR 21 1972
3,650,261
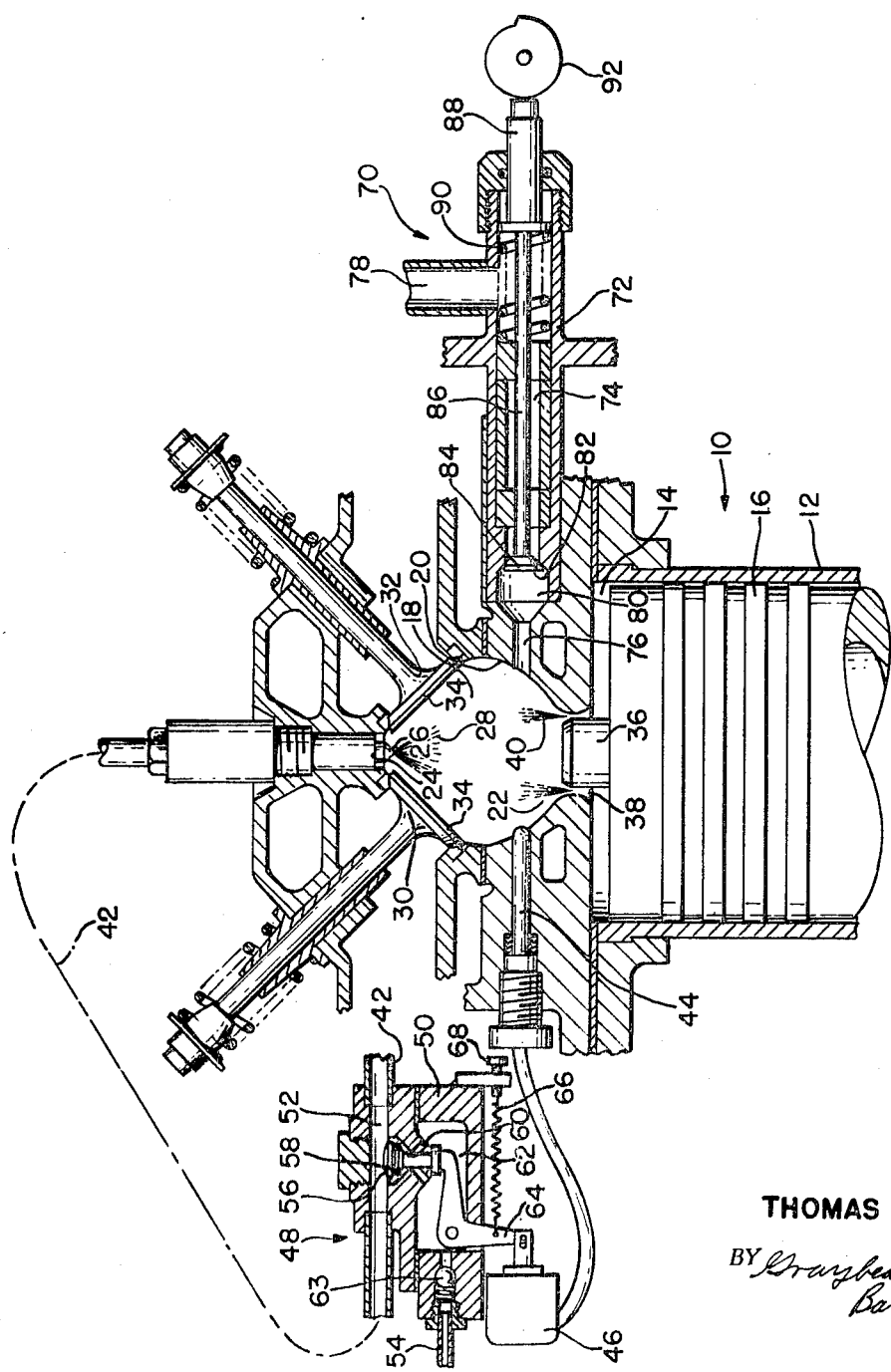
INVENTOR.
THOMAS A. HUTSELL
BY Graybeal Cole and
Barnard
ATTORNEYS

DIESEL ENGINE

BACKGROUND OF THE INVENTION

1. Field of the Invention

This invention relates generally to diesel engines, and more particularly to apparatus designed to insure substantially complete combustion of fuel in the diesel engine so as to reduce air pollution.

2. Description of the Prior Art

Various attempts have been made in the past to insure more complete burning of the engine fuel in a diesel engine. One approach has been to supply heat to uncooled portions of the combustion chamber to cause better vaporization of the fuel. Another had been to direct the fuel spray on a hot surface in the cylinder. Various types of precombustion chambers have been devised, but these were largely found to be impractical, probably because of fuel charge collecting on the wall, lack of adequate scavenging in the chamber and possibly other reasons.

Another problem in the prior art is that the temperatures in the combustion chamber vary, depending upon the engine speed, and at lower engine speeds there is often not enough heat to support combustion.

In general, while various attempts at obtaining better fuel air mixing, better temperature control, etc., have been attempted, there is still the problem of providing a practical diesel engine in which there is substantially complete combustion of the fuel with the result that diesel engines are a substantial contributing factor to air pollution.

SUMMARY OF THE INVENTION

In the present invention, there is provided a diesel engine in which there is a piston chamber and a combustion chamber communicating therewith through a port. A temperature sensing device responsive to the temperature in the combustion chamber functions through a valve to close a fuel bypass line only when temperature in the combustion chamber has reached a predetermined level. Further, a supercharger is provided to deliver increased air to the combustion chamber when the engine is operating at lower speeds, thus causing the temperature in the combustion chamber to reach the desired level for combustion at such lower engine speeds. Also, to provide better air fuel mixing, the piston is provided with a protruding element which reaches into the port at the upper part of the piston stroke to form an annular passageway through which air flows at increased speed to cause a mixing of the air and fuel.

DESCRIPTION OF THE DRAWING

FIG. 1 is a semi-schematic cross-sectional view taken through a plane coinciding with the longitudinal center axis of the engine cylinder shown.

DESCRIPTION OF THE PREFERRED EMBODIMENT

In the accompanying drawing, there is shown a portion of a diesel engine 10 having at least one cylinder 12 which defines a piston chamber 14 in which a piston 16 is mounted for reciprocating motion. Directly above the center of the cylinder 12 is a combustion chamber 18 formed in the head of the engine. The interior surface 20 of the combustion chamber 18 has a generally spherical configuration, and communicates with the piston chamber 14 through a port 22 which has a cross-sectional area substantially less than that of the combustion chamber 18 and the piston chamber 14.

At the top of the combustion chamber 18 is a fuel injector 24 which has a nozzle 26 that discharges fuel in a generally conical expanding spray pattern as indicated at 28. The center axis of the path along which the fuel is injected in the spray pattern is generally coincident with the center axis of the piston chamber 14, port 22 and center of the combustion chamber 18. The inlet and exhaust valves 30 and 32, respectively, are located immediately adjacent to, and on opposite sides of, the fuel injector 24. The center axes of these two valves 30 and 32 make a right angle with respect to one another, and each valve axis slants downwardly at an angle of 45° with respect to the common center axis of the piston chamber 14, port 22, combustion chamber 18 and fuel injector 24. The inner valve surface 34 of each of the valves 30 and 32 is generally flush with the interior surface 20 of the combustion chamber 18 and thus conforms generally to the spherical configuration of the surface 20.

Mounted to the top surface of the piston 16 and projecting upwardly therefrom is a protrusion or boss 36 which has a generally cylindrical configuration and a diameter moderately smaller than that of the port 22. This boss 36 is so positioned and dimensioned that as the piston 16 reaches the uppermost limit of its compression stroke the boss 36 enters into the port 22 so as to form a small annular passageway 38 within the periphery of the port 22. The air being displaced from the uppermost portion of the piston chamber 14 is forced through this annular passageway 38 to rush into the combustion chamber 18 in an outwardly expanding conical path as indicated at 40. Thus it can be seen that the spray pattern 28 of the fuel and the air flow path 40 intercept each other in the general center area of the combustion chamber 18 to cause a thorough mixing of fuel and air in the combustion chamber 18.

Fuel is supplied to the fuel injector 24 through a line 42. To insure that fuel is injected into the combustion chamber 18 only when the temperature in the chamber 18 is sufficiently high to cause combustion, there is provided a temperature sensing element 44 (such as a bead-type thermistor made by Fenwall Company of Framingham, Mass.) at the surface 20 of the combustion chamber 18. This temperature sensing element 44 is so arranged that when the temperature in the combustion chamber 18 reaches a predetermined level, it activates a solenoid 46 to close a bypass valve in the fuel line to allow fuel to be delivered to the fuel injector.

The valve 48 comprises a valve housing 50 having a fuel supply passageway 52 connected to and in line with the fuel line 42. The valve 48 has a fuel bypass line 54 and a normally open bypass valve element 56. This element 56 is arranged to seat in a recess 58 adjacent the fuel supply passageway 52, and ports 60 extend from the recess 58 into a valve chamber 62 which in turn communicates with the bypass line 54. The line 54 is provided with a spring and ball type check valve 63 which opens under moderate pressure to permit fuel to flow through the valve 63, through the ports 60 and chamber 62 and into the bypass line 54.

The solenoid 46 is connected to a crank arm 64 which, when the solenoid 46 is activated, pulls the bypass valve element 56 downwardly to seat in the recess 58 and thus close the bypass line 54. When the solenoid 46 is deactivated, a tension spring 66 pulls the crank arm 64 to cause the bypass valve element 56 to move back to its open position. The tension of the spring 66 can be increased or decreased by means of an associated adjusting nut 68. Thus it can be seen that when the solenoid 46 is activated through the temperature sensing element 44 responding to a predetermined temperature level in the combustion chamber 18 to close the bypass line 54, fuel is forced to pass through the fuel injector 24 into the combustion chamber 18. However, when the temperature sensing element does not sense an adequately high temperature in the combustion chamber 18 to support combustion, the solenoid 46 is not activated, and the fuel in the fuel supply line 42 will not be forced through the fuel injector 24, but will be diverted through the bypass line 54. Thus fuel will be injected into the combustion chamber 18 only when the conditions are such in the chamber 18 to support combustion.

To insure that there is a sufficient amount of air in the piston chamber 14 and combustion chamber 18 so that on the compression stroke of the piston 16 the temperature in the combustion chamber 18 will be sufficiently high to cause combustion, there is provided a supercharging mechanism, generally designated 70. This supercharger 70 comprises a housing 72 which defines an air passageway 74. This passageway communicates with the combustion chamber 18 through its outlet 76 and communicates with a source of compressed air through an inlet 78. (Compressed air for the supercharger 70 could be provided from a conventional source such as a compressor driven from the engine 10.) The air passageway 74 has an enlarged portion 80 so as to provide a seat 82 for a poppet valve 84. The valve 84 is mounted to a stem 86 which extends through the passageway 74 and terminates in a finger 88 which functions as a cam follower. A compression spring 90 is positioned around the valve stem 86 and functions to keep the valve 84 in a normally closed position.

The mechanism to operate the supercharger 70 is shown semi-schematically as a single lobe cam 92, which operates at cam shaft speed, which is ½ crank shaft speed, and engages the cam finger 88. The supercharging air is at a constant pressure. The cam 92 being geared to the engine will open and close at a predetermined place relative to the piston movement. The valve will be opened by the cam 92 at approximately the time the inlet valve 30 closes and will remain open a short period of time. It will close before the travel of the piston compresses the air to a point above the pressure of the supercharging air.

As the engine speed increases the dwell time of the cam decreases, thereby charging the cylinder with a regulated addition of air, above atmospheric, at all speeds. Thus at low speeds the cam dwell time holds the supercharging valve 70 open for a longer predetermined time. As the speed of the engine increases, and the temperature loss decreases, the valve is open for a shorter time.

Thus with the correct shape and dwell time plus supercharging pressure, it is possible to maintain a balance from the slowest possible engine speed to its peak operating condition. The supercharging pressure may be varied to compensate for elevation and/or ambient temperature conditions. This may be either manual, or automatically controlled.

To describe the overall operation of the apparatus of the present invention, let it be assumed that the engine 10 is operating as a four-cycle engine and the piston 16 is traveling upwardly in the cylinder 12 during its compression stroke. During the compression stroke, the air in the piston chamber 14 and the combustion chamber 18 is being compressed so that the air temperature rises. When the piston 10 is completing its compression stroke, the engines fuel supply mechanism (not shown herein) will force fuel through the fuel line 42. Since the minimum pressure required is about 2,000 p.s.i. to open fuel nozzle 26, the fuel will be diverted through the fuel bypass line 54 unless the bypass valve element is closed. This element 56 will close only when the temperature sensing element 44 becomes activated by the temperature in the combustion chamber 18 being raised to a predetermined level sufficient to support combustion. As indicated previously when the temperature in the chamber 18 has reached this level, the element 44 activates the solenoid 46 to seat the valve element 56 and close the bypass line 54. In this instance, fuel will be injected into the combustion chamber 18. However, if the temperature in the chamber 18 is not sufficient to support combustion, no fuel will be injected into the chamber 18.

Simultaneously with the injection of fuel into the chamber 18, the boss 36 on the piston 16 is entering the port 22 to cause the high velocity flow through the annular passageway 38. It should be noted that the piston chamber 14, passageway 38 and combustion chamber 18 collectively form a venturi passage, with the annular passageway 38 being the passageway portion of least area and maximum air velocity. This action, in cooperation with the diverging conical spray pattern of the fuel being injected from the injector 24 causes a thorough mixing of the fuel and air in the chamber 18.

If the engine 10 is operating at high rotational speeds, the air in the chambers 14 and 18 will usually be raised to a sufficiently high temperature that there will be combustion in the chamber 18. However, when the engine 10 is operating at lower rotational speeds, the heat of the air being compressed in the chambers 14 and 18 tends to be dissipated through the surrounding structure, and the temperature is sometimes not sufficient to support combustion. The supercharger 70 delivers compressed air to the chambers 14 and 18 in the aforedescribed manner to compensate for these temperature variations.

Under normal operating conditions, with the augmenting of air pressure from the supercharger 70 under the appropriate conditions, the temperature in the chamber 18 will be sufficiently high to activate the temperature sensing element 44 to cause the bypass line 54 to be closed so that fuel is injected into the chamber 18. However, in the circumstances that the temperature in the chamber 18 is not high enough to support combustion, no fuel will be injected into the chamber 18. This combined with the thorough mixing of fuel and air will cause substantially complete combustion of the fuel at all times, to provide a substantially clean engine exhaust.

What is claimed is:

1. In an internal combustion engine having a cylinder defining a piston chamber which has an upper and a lower end, a piston mounted for reciprocating motion in said chamber, a combustion chamber communicating with the upper end of the piston chamber through a port, valve means to supply air and exhaust combustion gases, a fuel injector to inject fuel into said combustion chamber, and a fuel line to supply fuel to the combustion chamber, the improvement comprising apparatus to accomplish substantially complete combustion of fuel in said engine, said apparatus comprising in combination:
   a. a temperature sensing device to sense temperature in said combustion chamber,
   b. a valve connecting to said fuel line and responsive to said temperature sending device in a manner to permit fuel flow to said combustion chamber only when the temperature in the combustion chamber is above a predetermined temperature, and
   c. supercharging means to supply compressed air to the combustion chamber to increase air pressure to bring air in the combustion chamber to a temperature suitable for combustion, whereby said valve will permit fuel to be delivered to said fuel injector.

2. The apparatus as recited in claim 1, wherein there is a bypass line connected to said valve, and said valve is arranged to permit fuel from the fuel line to flow through said bypass line when the temperature in said combustion chamber has not reached said predetermined temperature level.

3. The apparatus as recited in claim 2, wherein said valve is normally open to the bypass line and is closed by the sensing device responding to the temperature in the combustion chamber reaching said predetermined temperature level.

4. The apparatus as recited in claim 1, wherein there is supercharger control means responsive to engine speed, and said control means is arranged to cause said supercharger to deliver more air to the combustion chamber when the engine is operating at lower speeds.

5. The apparatus as recited in claim 4, wherein there is a bypass line connected to said valve, and said valve is arranged to permit fuel from the fuel line to flow through said bypass line when the temperature in said combustion chamber has not reached said predetermined temperature level.

6. The apparatus as recited in claim 1, wherein said combustion chamber and said piston chamber each has a respective cross-sectional area of a predetermined size, and the cross-sectional area of said port is substantially smaller than those of the combustion chamber and the piston chamber, whereby a venturi passageway is formed from said piston chamber through said port and into said combustion chamber, and there is a projection extending outwardly from said piston toward said port, said projection being positioned on said piston to enter into said port as the piston approaches its topmost position in the piston chamber, so that an annular passageway portion is formed at the area of minimum cross-sectional area in the venturi passageway.

7. The apparatus as recited in claim 6, wherein the combustion chamber is substantially spherical.

8. The apparatus as recited in claim 7, wherein said fuel injector is positioned in generally diametrically opposed relationship with respect to said port, whereby fuel is injected into the combustion chamber along an axis generally diametrically opposed to an axis along which air flows through said port into the combustion chamber.

9. The apparatus as recited in claim 8, wherein there is an inlet valve and an outlet valve, and said valves are located in said combustion chamber.

10. The apparatus as recited in claim 9, wherein the inlet and outlet valves are located in proximity with, and on opposite sides of, said fuel injector.

11. The apparatus as recited in claim 1, wherein:
   a. there is a bypass line connected to said valve and said valve is normally open to the bypass line to permit fuel from the fuel line to pass therein, and said valve is closed by the sensing device responding to the temperature in the combustion chamber reaching said predetermined temperature level,
   b. there is a supercharger control means responsive to engine speed, and said control means is arranged to cause said supercharger to deliver more air to the combustion chamber when the engine is operating at lower speeds,
   c. said combustion chamber is substantially spherical, and said combustion chamber and said piston chamber each has a respective cross-sectional area of a predetermined size, and the cross-sectional area of the port is substantially smaller than those of the combustion chamber and the piston chamber, whereby a venturi passageway is formed from the piston chamber through said port and into said combustion chamber,
   d. there is a projection extending outwardly from the piston toward said port, said projection being positioned on the piston to enter into the port as the piston approaches its topmost position in the piston chamber, so that an annular passageway portion is formed at the area of minimum cross-sectional area in the venturi passageway,
   e. said fuel injector is positioned in generally diametrically opposed relationship with respect to said port, whereby fuel is injected into the combustion chamber along an axis generally diametrically opposed to an axis along which air flows through the port into the combustion chamber, and
   f. there is an inlet valve and an outlet valve located in said combustion chamber, and the inlet and outlet valves are located in proximity with and on opposite sides of the fuel injector.

* * * * *